L. P. OHLIGER, G. WILLSON, J. A. WHITE AND A. R. REID.
RELIEF MECHANISM FOR STORAGE BATTERIES.
APPLICATION FILED JAN. 23, 1918.

1,363,263.   Patented Dec. 28, 1920.

WITNESS:
Dominic P. Cone
Ralph Munders

INVENTORS.
Lewis P. Ohliger
Albert R. Reid
George Willson
John A. White
BY Raymond H. Van Neat
ATTORNEY.

UNITED STATES PATENT OFFICE.

LEWIS P. OHLIGER, GEORGE WILLSON, AND JOHN A. WHITE, OF NIAGARA FALLS, AND ALBERT R. REID, OF BUFFALO, NEW YORK, ASSIGNORS TO U. S. LIGHT & HEAT CORPORATION, OF NIAGARA FALLS, NEW YORK, A CORPORATION OF NEW YORK.

RELIEF MECHANISM FOR STORAGE BATTERIES.

1,363,263.     Specification of Letters Patent.     Patented Dec. 28, 1920.

Application filed January 23, 1918. Serial No. 213,367.

*To all whom it may concern:*

Be it known that we, LEWIS P. OHLIGER, GEORGE WILLSON, and JOHN A. WHITE, citizens of the United States, residing at Niagara Falls, in the county of Niagara and State of New York, and ALBERT R. REID, a citizen of the United States, residing at Buffalo, in the county of Erie and State of New York, have invented new and useful Improvements in Relief Mechanism for Storage Batteries, of which the following is a specification.

The present invention relates to relief mechanism for storage batteries.

More particularly the present invention relates to mechanism whereby the gas may escape from the interior of a storage battery cell but which will prevent the escape of the electrolyte should the cell be tipped at a great angle or turned up-side-down.

The invention is particularly applicable to portable storage batteries or batteries used in aeroplanes, which are carried at a great variety of angles.

An object of the present invention is to provide a relief mechanism which will permit the escape of gases from the interior of the battery cell, but which will entirely seal said cell to prevent the escape of the electrolyte, if the cell should be tipped at such an angle that the electrolyte would tend to escape.

A further object is to provide relief mechanism which will invariably operate to prevent the escape of electrolyte and which will invariably open when the cell is returned to its normal position to permit the escape of gases from within the cell.

A further object is to provide relief mechanism of the kind referred to which is cheap to manufacture and sturdy in construction.

A further object is to provide relief mechanism which embraces a minimum of space and which may take the place of the ordinary filler and inspection cap.

Further objects will be apparent as the description proceeds.

Referring to the drawings—

Figure 1:
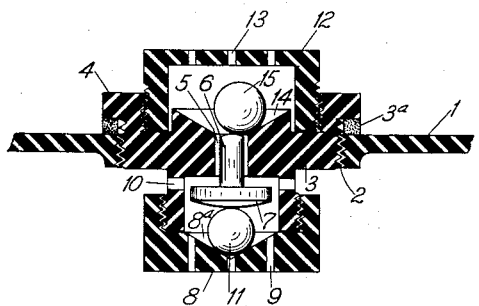
Figure 1 represents a sectional view of one embodiment of the present invention.

Referring first to Fig. 1, the numeral 1 indicates a part of the cover of a storage battery cell. Preferably centrally located in said cover 1 is an aperture 2 in which may be mounted by screw-threads or otherwise, the bushing 3. A sufficiently tight fit between the cover 1 and bushing 3 should be provided to prevent the escape of gases or electrolyte therebetween. For this purpose a gasket 3ª may be provided, as shown. Said bushing 3 may be provided with a collar 4 which should be of a shape to be conveniently grasped for manipulating said bushing 3 to mount same within the cover 1.

Located preferably centrally of the bushing 3 is a hole 5 whose axis should extend in a vertical direction. Loosely mounted within said hole 5 is a plunger 6, upon the lower end of which is a head 7 adapted to coöperate with the bushing 3 to act as a valve.

Mounted on the underside of the bushing 3 is a cap 8, the upper side of which is cored out to form an inverted cone or cup-shaped portion 8ª, whose apex will lie substantially in the axis of the hole 5. Said cap 8 will be provided with holes 9 which will be of sufficient size to permit the passage of electrolyte therethrough without clogging. Apertures 10 may be provided in the bushing 3 to permit the escape of gas from the upper part of the cell. Mounted in the cap 8 and riding in the inverted cone thereof is a ball 11 which, as will be explained hereinafter, is adapted to operate against the head 7 of the plunger 6, whereby to operate said head to valve-closing position.

Mounted on the upper side of bushing 3 is a cap 12 provided with vents 13. The upper side of bushing 3 is cored out to provide a conical surface or cup-shaped portion 14. A ball 15 is mounted within the cap 12 and adapted to ride upon the surface 14. The plunger 6 should be of sufficient length that when the head 7 thereof is in contact with the bushing 3, said plunger should extend slightly above the apex of the conical portion 14. The angles of the conical surfaces 8ª and 14 may be chosen as desired, as may also the diameters of the balls 11 and 15. Said angles and dimensions should be so chosen, however, that upon tilting of the battery cell the ball 15 will roll at least as readily as the ball 11.

A mode of operation of the above described embodiment of the invention is substantially as follows. When the cell is in a vertical position, the balls 11 and 15 will occupy positions in the apexes of the conical surfaces 8ª and 14 respectively. The plunger 6 will be in its lowermost position and the head 7 will be out of engagement with the bushing 3. Gas from the cell may now escape through apertures 9 and 10 through the hole 5, thence through the vents 13, to the outside atmosphere. If the cell should be tilted at a predetermined angle, the ball 11 will roll along the conical surface 8ª and will thereby move the plunger 6 along the hole 5 to move the head 7 into valve-closing position with the bushing 3. The cell will now be tightly closed whereby to prevent the escape of any electrolyte, though the cell be turned at any angle or completely inverted. When the cell is again righted, the ball 11 will roll to the apex of the conical surface 8ª, allowing the plunger 6 to drop, thereby breaking engagement between the head 7 and bushing 3. At the same time, the ball 15 will roll toward the apex of the conical surface 14 and by the force of its weight and by the force of its impact, will insure the movement of the plunger 6. The entire mechanism supported by the bushing 3 may be readily removed from the cover 1 when inspection or refilling of the cell is necessary. The under side of the head 7 of the plunger 6 may be flat or rounded, as desired, so long as the relative angles between the conical surface 8ª and the under side of said head 7 are such that movement of the ball 11 from its central position will necessarily tend to move said head 7.

Figure 2:
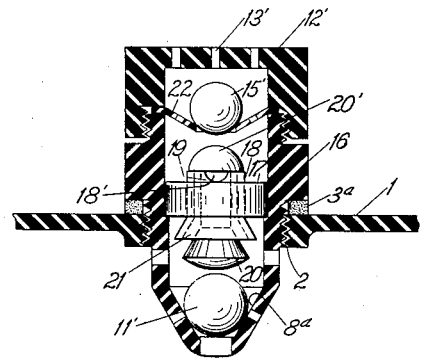

The modification disclosed in Fig. 2 is similar to the embodiment shown in Fig. 1 in a number of particulars. In Fig. 2 a cup-shaped member 16 is mounted in the cover 1. Said cup-shaped member is provided with a conical surface 8ª upon which rides a ball 11', as in Fig. 1. A cap 12' is provided for closing the upper part of the cup-shaped member 16 to prevent the entrance of foreign material. Said cap 12' is provided with vents 13'. Mounted within the cup-shaped member 16 is a bushing 17 within which is mounted a cylinder 18 which serves as a guide for the plunger 19, provided at its lower end with the head 20 and at its upper end with the head 20'. The cylinder 18 may be flared to provide a seat 21 with which the head 20 may engage to provide a valve. The plunger 19 should be loosely mounted within the cylinder 18. Mounted in the upper part of the cup-shaped member 16 is a diaphragm 22 which should be in the form of an inverted cone. The apex of the conical diaphragm 22 should be open. Resting upon said diaphragm 22 is a ball 15'. The plunger 19 should be of sufficient length to extend slightly above the apex of the conical diaphragm 22 when the plunger 19 is in its uppermost position, whereby, the ball 15' will strike the head 20' of the plunger 19 when said ball rolls to its central position, upon the righting of the cell after having been tilted. The dropping of said plunger will thus be assured. The head 20' will rest upon the top of cylinder 18 whereby, when said plunger is in its lowermost position, said plunger will be held substantially in parallelism with the axis of cylinder 18. Fillets 18' are provided in the top of cylinder 18 to permit the escape of gases beneath the head 20'.

Figure 3:
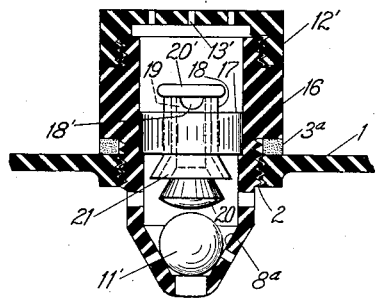
Figs. 2 and 3 represent sectional views of modifications.

It may be preferred to omit the ball 15', together with its supporting means. Fig. 3 shows a construction with the ball 15' and the diaphragm 22 omitted.

The members 11, 11', 15 and 15' need not take the form of balls but may take any form which will move upon tilting of the mechanism.

The described embodiments have been chosen merely for the purpose of illustration and should not be considered as limiting the invention. Many modifications will occur to those skilled in the art. It is intended in this patent to cover all such modifications that come within the scope of the invention as defined by the appended claims.

What we claim as new and desire to secure by Letters Patent of the United States, is—

1. In combination, a cell cover, valve means for preventing the passage of fluid through said cover, a member providing a cup-shaped surface beneath said vlave means, a roller adapted under normal conditions to rest in the apex of said cup-shaped surface and upon the tilting of said cover to move said valve means to closing position.

2. A battery cell having means providing a passage-way, a plunger riding in said passage-way, valve mechanism for closing said passage-way when said cell is tilted to a predetermined angle, said valve mechanism being movable with said plunger and roller mechanism for operating said plunger when said tilting occurs.

3. In relief mechanism. in combination, means providing a passage-way, a plunger riding in said passage-way, valve mechaanism movable with said plunger, and roller mechanism adapted upon the tilting of said relief mechanism to close said valve mechanism and upon righting of said relief mechanism to open said valve mechanism.

4. In relief mechanism, in combination, a member providing a vertical passage-way, a member providing a cup-shaped surface with its apex substantially in alinement with the axis of said passage-way, and a roller carried by said last mentioned member adapted upon the tilting of said relief mechanism to effect the closing of said passage-way.

5. In combination, a cell cover having a hole therein for filling or inspection, a member adapted to close said hole, said member including a valve, a ball for operating said valve, and a member providing a cup-shaped surface upon which said ball normally rests.

6. In a cell, a cover, means providing a passage-way therethrough with its axis vertical, a plunger mounted in said passage-way, valve means movable with said plunger, means providing a surface whose proximity to said valve means decreases progressively from the axis of said passage-way, and roller means located between said surface and said valve means.

7. In combination, valve means, means providing a cup-shaped surface beneath said valve means, and roller means between said valve means and said cup-shaped surface.

8. In relief mechanism, in combination, means providing a passage-way, a plunger riding in said passage-way, valve mechanism movable with said plunger, roller mechanism adapted upon the tilting of said relief mechanism to operate said valve mechanism to close same, and means for maintaining said plunger normally in parallelism with the axis of said passage-way.

9. In relief mechanism, in combination, means providing a passage-way, a plunger riding in said passage-way, valve mechanism movable with said plunger, roller mechanism adapted upon the tilting of said relief mechanism to close said valve mechanism and upon righting of said relief mechanism to open said valve mechanism, and means for maintaining said plunger normally in parallelism with the axis of said passage-way.

10. In a cell, a cover, means providing a passage-way therethrough with its axis vertical, a plunger mounted in said passage-way, valve means movable with said plunger, means providing a surface whose proximity to said valve means decreases progressively from the axis of said passage-way, roller means located between said surface and said valve means, and means for maintaining said plunger normally in parallelism with the axis of said passage-way.

In witness whereof, we have hereunto subscribed our names.

LEWIS P. OHLIGER.
GEORGE WILLSON.
JOHN A. WHITE.
ALBERT R. REID.